US012811869B2

(12) United States Patent
Amani et al.

(10) Patent No.: US 12,811,869 B2
(45) Date of Patent: Nov. 24, 2026

(54) APPORTIONING OF DATA TRAFFIC BETWEEN COMMUNICATION CHANNELS

(71) Applicant: BRITISH TELECOMMUNICATIONS PUBLIC LIMITED COMPANY, London (GB)

(72) Inventors: Mojdeh Amani, London (GB); Alan Smith, London (GB); Hassan Hamdoun, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 551 days.

(21) Appl. No.: 18/250,904

(22) PCT Filed: Oct. 26, 2021

(86) PCT No.: PCT/EP2021/079660
§ 371 (c)(1),
(2) Date: Apr. 27, 2023

(87) PCT Pub. No.: WO2022/090213
PCT Pub. Date: May 5, 2022

(65) Prior Publication Data

US 2023/0403222 A1 Dec. 14, 2023

(30) Foreign Application Priority Data

Oct. 29, 2020 (GB) ..................................... 2017135

(51) Int. Cl.
*H04L 43/0876* (2022.01)
*H04L 41/5009* (2022.01)
*H04L 41/5067* (2022.01)

(52) U.S. Cl.
CPC ...... *H04L 43/0876* (2013.01); *H04L 41/5009* (2013.01); *H04L 41/5067* (2013.01)

(58) Field of Classification Search
CPC ............. H04L 43/0876; H04L 41/5009; H04L 41/5067; H04L 41/5019; H04L 41/509; H04L 43/0852
See application file for complete search history.

(56) References Cited

U.S. PATENT DOCUMENTS 8,750,125 B2 * 6/2014 Harmatos ............. H04L 47/629 370/235.1
9,277,472 B1 * 3/2016 Price ................... H04W 36/304
(Continued)

FOREIGN PATENT DOCUMENTS

CN 111416770 A * 7/2020 ............. H04L 69/22
EP 3522479 A1 * 8/2019 ............. H04L 69/14
(Continued)

OTHER PUBLICATIONS

International Preliminary Report on Patentability for PCT/EP2021/079660 dated May 11, 2023 (9 pages).
(Continued)

*Primary Examiner* — Shean Tokuta
(74) *Attorney, Agent, or Firm* — Nixon & Vanderhye P.C.

(57) ABSTRACT

Apportioning of Data Traffic Between Communication Channels Methods and apparatus are disclosed for apportioning data traffic between a plurality of different communication channels, the data traffic to be apportioned being data traffic travelling to and/or from at least one user-device (102*a*, 102*b*) in a local area network (100) in which a plurality of network-reliant applications are used, the data traffic in respect of the network-reliant applications travelling via a local area network gateway device (101) of the local area network configured to communicate via one or more networks (120, 130) outside the local area network using the plurality of different communication channels.

13 Claims, 5 Drawing Sheets

Entities and Interactions involved in QoE Optimization Process

(56) References Cited

U.S. PATENT DOCUMENTS

| | | | | |
|---|---|---|---|---|
| 10,855,555 | B2 * | 12/2020 | Paruchuri | H04L 41/5009 |
| 10,897,424 | B1 * | 1/2021 | Dhanabalan | H04L 41/0894 |
| 11,082,908 | B2 * | 8/2021 | Cheng | H04L 47/24 |
| 11,323,312 | B1 * | 5/2022 | Banka | H04W 28/0268 |
| 2013/0286941 | A1 * | 10/2013 | Lee | H04L 41/0894 370/328 |
| 2014/0229210 | A1 | 8/2014 | Sharifian et al. | |
| 2014/0269506 | A1 * | 9/2014 | Rolfe | H04W 8/00 370/328 |
| 2015/0043336 | A1 * | 2/2015 | Zhu | H04W 28/0268 370/230 |
| 2016/0262073 | A1 * | 9/2016 | Muley | H04M 15/66 |
| 2016/0285752 | A1 * | 9/2016 | Joshi | H04L 45/02 |
| 2017/0251515 | A1 * | 8/2017 | Altman | H04L 43/08 |
| 2017/0325120 | A1 | 11/2017 | Szilagyi et al. | |
| 2018/0359730 | A1 | 12/2018 | Jung et al. | |
| 2019/0205749 | A1 * | 7/2019 | Tan | G06N 3/045 |
| 2020/0288212 | A1 | 9/2020 | Alvarez Dominguez et al. | |
| 2020/0296012 | A1 * | 9/2020 | Paruchuri | H04L 41/5009 |
| 2020/0296023 | A1 * | 9/2020 | Kumar | H04L 43/0894 |
| 2020/0336565 | A1 * | 10/2020 | Theverapperuma | H04W 28/0268 |
| 2021/0092062 | A1 * | 3/2021 | Dhanabalan | H04L 43/08 |
| 2022/0141685 | A1 * | 5/2022 | Ergen | H04L 45/245 370/252 |
| 2023/0403222 | A1 * | 12/2023 | Amani | H04L 41/5009 |
| 2024/0396846 | A1 * | 11/2024 | Nemeth | H04L 47/2416 |
| 2025/0130306 | A1 * | 4/2025 | Meadow | G01S 5/10 |

FOREIGN PATENT DOCUMENTS

| | | | | |
|---|---|---|---|---|
| EP | 3633939 | A1 * | 4/2020 | H04L 47/2441 |
| EP | 3709573 | A1 * | 9/2020 | H04L 41/40 |
| EP | 3709577 | A1 * | 9/2020 | H04L 43/20 |
| EP | 3709581 | A1 * | 9/2020 | H04L 45/036 |
| WO | WO-2012142437 | A1 * | 10/2012 | H04W 28/0268 |
| WO | WO-2013123467 | A1 * | 8/2013 | H04W 28/0268 |
| WO | WO-2016038611 | A1 * | 3/2016 | H04L 43/20 |
| WO | 2016150748 | A1 | 9/2016 | |
| WO | 2019052897 | A1 | 3/2019 | |
| WO | WO-2019158050 | A1 * | 8/2019 | H04W 36/38 |
| WO | WO-2021166288 | A1 * | 8/2021 | H04L 47/805 |
| WO | WO-2022090213 | A1 * | 5/2022 | H04L 43/0852 |

OTHER PUBLICATIONS

Mojdeh Amani et al., "QoS-aware and Policy Based Mobile Data Offloading", King's College London, University of London, Centre for Telecommunications Research, Sep. 2013, 110 pages, downloaded from: https://kclpure.kcl.ac.uk/portal/.

International Search Report and Written Opinion of the ISA for PCT/EP2021/079660, mailed Dec. 6, 2021, 12 pages.

Combined Search and Examination Report under Sections 17 and 18(3) for GB2017135.1, dated Jul. 16, 2021, 11 pages.

* cited by examiner

Figure 1 - Entities and Interactions involved in QoE Optimization Process

Figure 2 - QoE Score Calculation

Figure 3 - Personalized QoE Optimization

Figure 4 - Application Flow Optimization Elements

APPORTIONING OF DATA TRAFFIC BETWEEN COMMUNICATION CHANNELS

CROSS-REFERENCE TO RELATED APPLICATIONS

This application is the U.S. national phase of International Application No. PCT/EP2021/079660 filed Oct. 26, 2021, which designated the U.S. and claims priority to GB 2017135.1 filed Oct. 29, 2020, the entire contents of each of which are hereby incorporated by reference.

TECHNICAL FIELD

The present invention relates to methods and systems for apportioning data traffic between different communication channels, the data traffic being data traffic travelling to and/or from one or more devices in a Local Area Network (LAN). The apportioning of data traffic, generally between different communication channels outside the LAN, may be done in order to provide an improved or optimized Quality of Experience (QoE) for users of devices in the LAN.

BACKGROUND

Assessing the performance of networks, such as Internet Protocol-based networks, has long been a concern, not only for Internet Service Providers (ISPs) but also for users, standards bodies, network equipment vendors, regulators and others.

In relation to network and communications technology, the terms "Quality of Service" (QoS) and "Quality of Experience" (QoE) are often used, the former relating generally to an objective (or at least substantially objective) measure of performance in respect of the network or communications service provided to customers, and the latter relating generally to a subjective (or at least substantially subjective) measure indicative of how satisfied users are likely to be with the services provided to them.

"Quality of Service" can be defined and measured in various ways, taking account of various different criteria (including network characteristics such as loss, delay, jitter and throughput), but once defined, it can be measured objectively, because such network characteristics can be measured, and values in respect thereof can then be combined (if required) according to a predetermined function in order to obtain one or more "QoS measures", "QoS values" or other such "QoS indications". "Quality of Experience", while generally being dependent on the same or similar criteria, and therefore generally being dependent at least in part on the "Quality of Service" being achieved in respect of the service or services provided to an individual customer (and therefore generally correlating to some extent with the "Quality of Service" being achieved for that customer), is essentially a subjective measure, so cannot generally be measured directly other than by obtaining feedback directly from customers as to their satisfaction levels with the services concerned (which themselves will generally be subjective—they may be affected by the mood of the customer concerned, or whether the customer has previous experience of other comparable services being better or worse). "Quality of Experience" can however be estimated or assessed in various ways, generally taking account of one or more types of performance criteria such as those generally used to obtain "Quality of Service" measures, then estimating the effect(s) of these on the experience of a service, as it will be perceived by a particular customer or by a generic "average customer", for example. Thus, while "Quality of Experience" is generally a subjective measure, it can—once suitably defined—also be estimated, assessed, evaluated or calculated in an objective manner, based (at least partly) on measurable network performance data.

Referring to prior disclosures, International patent application WO2016/150748 (British Telecommunications plc) relates to a technique for diagnostic testing, and to methods and apparatus for obtaining diagnostic test results in respect of network-reliant applications used by devices in a local user network, and for triggering diagnostic testing procedures and obtaining test results indicative of the Quality of Experience of users of applications being run on user-devices in the user network.

In another area of telecommunications technology, various techniques exist for providing "failover". Such techniques aim to ensure that some form of connectivity is provided for devices in a network, and generally involve switching to a redundant or standby connection or telecommunications system in the event of a failure of the default connection or system for the network.

It was recognised in a research thesis entitled "QoS-aware and Policy Based Mobile Data Offloading" (Mojdeh Amani, King's College London, 104, available online at https://kclpure.kcl.ac.uk/portal/files/61288805/2014 Amani Mojdeh 0644189 ethesis.pdf) that growth in the number of 3G/4G enabled devices such as smartphones and tablets had created exceptional demand for ubiquitous connectivity and high quality applications and that as a result, cellular networks were struggling to keep up with the demand for data traffic. The emergence of LTE (Long Term Evolution) had boosted cellular network throughput, but these improvements were not sufficient given the limited availability of licensed spectrum. The thesis proposed various offloading algorithms intended to address challenges in Wi-Fi offloading to LTE networks, and proposed solutions for when performance needs exceed the capability of the LTE access network.

US patent application US2014/0229210 ("Sharifian et al") entitled "System and Method for Network Resource Allocation Considering User Experience, Satisfaction and Operator Interest" relates to a network resource allocation technique which aims to consider user experience, satisfaction, and operator interest.

US patent application US2017/0325120 ("Szilagyi et al") entitled "Quality of experience enforcement in communications" relates to a network node which performs QoE measurements to obtain information on QoE experienced by a terminal device regarding an application session. Based on the QoE measurements, the network node executes actions to enforce the QoE of an application session to meet the resource requirement.

Challenges remain as to how to apportion data traffic between different communication channels available for communication involving devices in a local area network in which a plurality of network-reliant applications are used in such a way as to provide an improved or optimized Quality of Experience for one or more users of devices in the local area network.

SUMMARY OF THE INVENTION

According to a first aspect of the invention, there is provided a method of apportioning data traffic between a plurality of different communication channels, in which the data traffic is:

travelling to and/or from at least one user-device in a local area network, in which a plurality of network-reliant applications are used;

in respect of the network-reliant applications; and travelling via a local area network gateway device of the local area network, in which the local area network gateway device is configured to communicate via one or more networks outside the local area network using the plurality of different communication channels;

the method comprising the steps of:

in respect of each of the plurality of different communication channels, calculating a Quality of Experience, QoE, score, wherein each QoE score is obtained by performing the steps of:

identifying flows carrying the data traffic via said communication channel;

identifying flow characteristics of said flows;

identifying, for the one or more of said plurality of network-reliant applications, a set of one or more flow characteristic types designated as significant flow characteristic types for the network-reliant applications; and calculating the QoE score for the communication channel in dependence on the identified flow characteristics of said flows and on the identified flow characteristic types designated as significant flow characteristic types for the network-reliant applications in respect of which flows have been identified; and then apportioning between the communication channels the data traffic in dependence on the calculated QoE scores for each of the plurality of different communication channels.

According to preferred embodiments, each communication channel may be a network connection according to a specific access technology, including hard-wired, wireless and hybrid access technologies.

According to preferred embodiments, the communication channels may include at least one Digital Subscriber Line, xDSL communication channel. The communication channels may include one or more of ADSL, VDSL, G.fast or other Digital Subscriber Line communication channels, for example, or other hard-wired access technologies such as cable or fibre to the home. Alternatively or additionally, the communication channels may include at least one cellular communication channel, optionally more than one cellular communication channel, the communication channels include one or more of 2G, 3G, 4G and 5G communication channels, for example.

According to preferred embodiments, the step of obtaining a Quality of Experience, QoE, score may comprise use of Deep Packet Inspection in respect of the data traffic.

According to preferred embodiments, the step of obtaining a Quality of Experience, QoE, score in respect of a communication channel is performed by the local area network gateway device.

According to preferred embodiments, the Quality of Experience, QoE, score for a communication channel may be calculated in dependence on one or more characteristics in respect of data traffic being carried via said communication channel, the one or more characteristics being selected from the following:

characteristics associated with communication speed;

characteristics associated with communication delay and/or delay variation;

characteristics associated with reliability;

characteristics associated with data loss;

characteristics associated with error rate;

characteristics associated with communications quality.

According to preferred embodiments, different flow characteristic types are designated as significant flow characteristic types for different network-reliant applications.

According to a second aspect of the invention, there is provided apparatus configured to perform a method according to the first aspect of apportioning data traffic between a plurality of different communication channels, the data traffic to be apportioned being data traffic travelling to and/or from at least one user-device in a local area network in which a plurality of network-reliant applications are used, the data traffic in respect of the network-reliant applications travelling via a local area network gateway device of the local area network configured to communicate via one or more networks outside the local area network using the plurality of different communication channels.

According to preferred embodiments, the apparatus may comprise the local area network gateway device.

The various options and preferred embodiments referred to above in relation to the first aspect are also applicable in relation to the second aspect.

BRIEF DESCRIPTION OF THE DRAWINGS

A preferred embodiment of the present invention will now be described with reference to the appended drawings, in which.

DESCRIPTION OF PREFERRED EMBODIMENTS OF THE INVENTION

Figure 1:
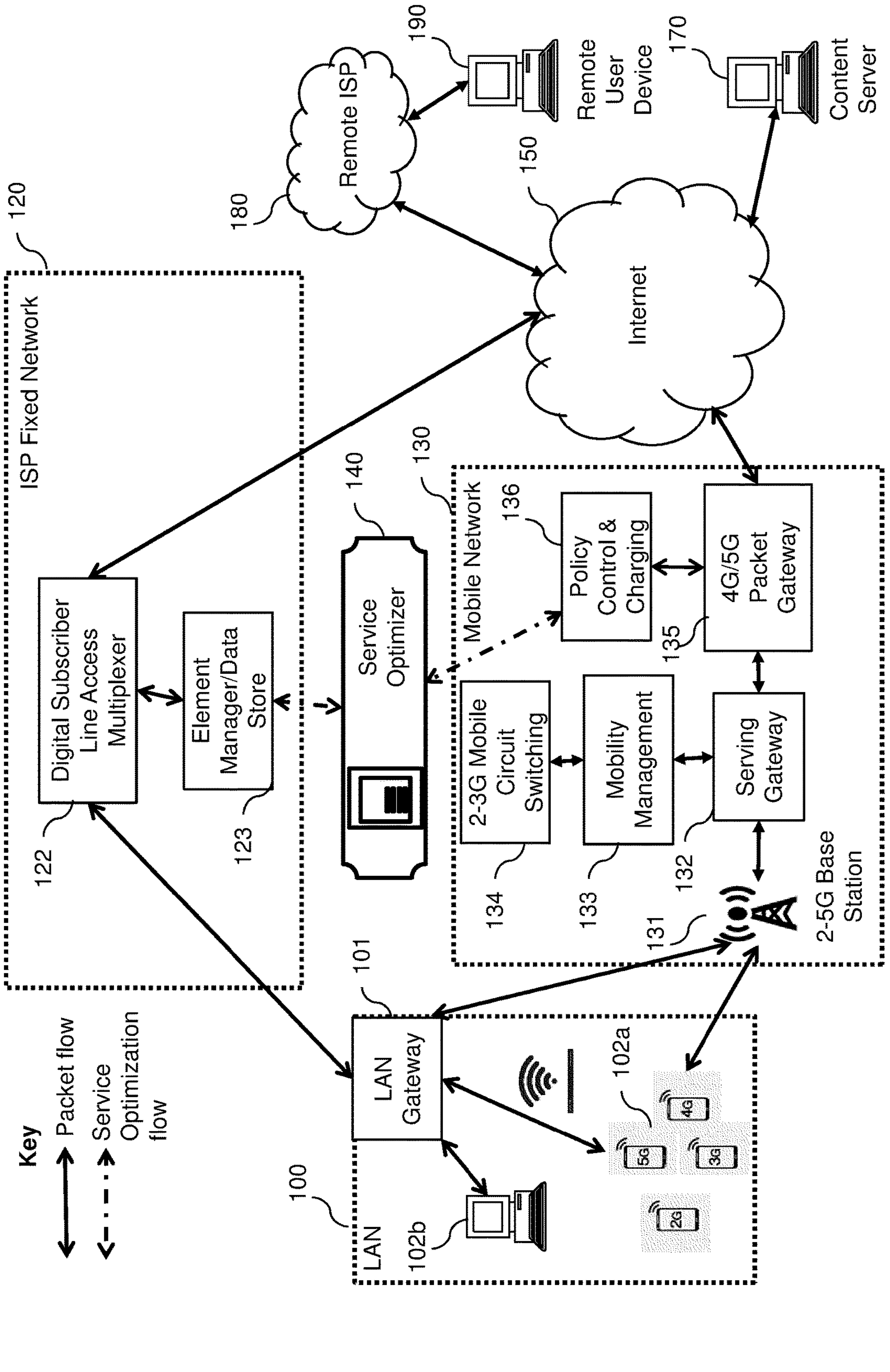
FIG. 1 shows entities and interactions which may be involved when apportioning data traffic between different communication channels according to an embodiment of the invention.

Embodiments of the invention determine how to apportion data traffic between a plurality of different communication channels, in which the data traffic that is to be apportioned travels to and/or from user-devices in a Local Area Network (LAN), and in which network-reliant applications are used in the LAN.

The data traffic travels to and/or from user-devices via a LAN gateway device, which is in turn configured to communicate with one or more networks outside the LAN using the plurality of different communication channels.

The apportioning (or allocating) of the data traffic between the different communication channels is determined in dependence upon Quality of Experience (QoE) scores for the respective communication channels, which are determined in dependence on the network-reliant applications actually being used in the LAN and on the flow characteristics of flows carrying data traffic via the respective communication channels in respect of the various network-reliant applications.

By apportioning the data traffic in dependence on QoE scores calculated for respective communication channels in dependence on flow characteristics of flows actually being used in respect of the network-reliant applications being used, including at least one flow characteristic-type designated as a significant flow characteristic-type for the network-reliant applications in respect of which flows have been identified.

In this way, it is possible to perform the apportioning so as to improve (and ideally optimise) the chances of at least maintaining (that is, at least matching at a pre-existing level) an overall QoE in respect of any network-reliant applications being used, which may help ensure that customers do not notice any significant degradation in performance that may be caused by issues affecting any of the communication channels being used for communication between the LAN gateway device and the networks outside the LAN.

As indicated earlier, how internet customers rate the service they receive from their various internet-connected computing and telephony devices is to a large extent dependent on the QoE they perceive for internet-delivered services. The QoE may depend on the end-to-end connection (as provided by a Network Services Provider (NSP) or Internet Services Provider (ISP)) between: user-devices in a LAN; and remote user-devices, content origin servers or other devices outside the LAN. The QoE may be a function of at least one of the following:

a) The QoS achieved for the connection; this may be defined and calculated based on network performance characteristics (herein referred to as "network KPIs"), such as: delay (or "latency"); jitter; bandwidth; packet loss rate; and/or packet error rate.
b) Network faults/degradations that arise during a lifetime of the connection used by the network-reliant applications, which may impact on the network KPIs and therefore on the QoS.
c) Network-reliant applications' specific KPIs, which are the parameters that are most impactful on the performance of the network-reliant application; for example, where the network-reliant application includes a web browser, the associated specific KPIs may include HTTP setup-time, HTTP IP-service access failure rate, etc.
d) A subjective measure of the user experience during the application connection (or session) time for the given application flow may also be used, e.g. buffering impacts on user experience, webpage load time influence on user abandoning some websites, etc.

Network KPIs may be measured using techniques such as Deep Packet Inspection (DPI), in which both packet headers and packet data are inspected (in detail) as packets pass an inspection point. DPI may be implemented using port-mirroring or optical splitting (which, advantageously, do not delay the packets), probes or in other ways. DPI techniques may be used to derive measurements of flow characteristics, device and application characteristics, as well as allowing other measurements to be derived. Network KPIs may also be measured using an alternative to DPI known as "shallow inspection", in which only portions of a packet relating to its address (e.g. headers, IP addresses, port-number etc.) are extracted and inspected from packets; in contrast to DPI, this may help reduce the latency of packet flows. DPI and shallow inspection may also be combined in a hybrid technique for ascertaining network KPIs.

QoE is an important issue for home network performance and monitoring solutions. An approach for estimating the correlation between QoE scores and network KPIs is to obtain a score indicative of a subjective measure of user experience (e.g. Mean Opinion Score (MOS) from users for a given set of applications (e.g. Voice over IP, video streaming, web browsing, real-time gaming)) and then calculate the QoE while varying the network KPIs.

Routing traffic across different access technologies (e.g. wireless LAN (for example in the form of "WiFi"), fixed, cellular (i.e. 2G, 3G, 4G, 5G), etc.) may be accomplished by network routers and Layer 3 switches using packet headers pointing to IP addresses of the next hop.

There are various routing protocols and design approaches to construct an optimum flow that meets applications' QoE requirements. For example, Content Delivery Network (CDN) redirection is an important factor for traffic routing and can directly influence network KPIs, and therefore QoE. For example, re-routing traffic during QoS degradation, route filtering at core routers and Access Control Lists (ACL) at network edges can all have an impact on network KPIs. Moreover intelligence of the routing protocol selected (e.g. Border Gateway Protocol (BGP), Open Shortest Path First (OSPF) and Enhanced Interior Gateway Routing Protocol (EIGRP)) and how routing protocol selection affects end-to-end connectivity (e.g. for a given segment of the network, an application and/or a flow might result in less optimized connectivity) and convergence time during network QoS degradation or network failure.

Wireless LANs can be a major cause of poor QoE due to variability of throughput and being interference prone. Wide area cellular networks (such as those based on 4G technology) can be used as a backup access technology and/or to help boost (e.g. throughput) access for multi-access (including hybrid-access) devices, such as by using TCP-bonding of application flows. For example, smart phones may combine the use of both wireless LAN and 4G LTE technologies, such as for "Voice over LTE" (VoLTE) and "Voice over WiFi" (VoWiFi).

The accuracy with which network KPIs may be correlated to QoE may be affected by network faults, degradations, abnormal conditions/events, and other factors. For example, the impact of packet loss may depend on the application and the transport layer protocol. How packet loss manifests itself with respect to user experience may vary depending on whether the application uses a TCP or UDP protocol. A UDP application (e.g. RTP multicast streaming) affected by packet loss may suffer visible video dropouts, lags and quality loss perceived by the user. For TCP applications packet-loss may result in delay, congestion or reduction in throughput. So for example Internet television streaming on a web device (e.g. mobile or PC) (i.e. a TCP application) may have different QoE characteristics during network deterioration to consumption of the same content via a dedicated Internet television set-top-box (i.e. a UDP application).

With the embodiment to be described, a computer-implemented Service Optimizer entity, which would generally operate under the control of a Network Service Provider (NSP), obtains information relating to flows carrying data traffic via respective communication channels to/from user-devices in the LAN in respect of one or more network-reliant applications, and uses this to perform the following:

(i) Calculate a QoE score for respective network-reliant applications for each of a number "N" of available communications technologies/connections (e.g. Fixed Network, one or more cellular channels, etc.). In this embodiment, the calculation is performed by the LAN Gateway device for all the communication technologies/connections available to the user-devices via that LAN gateway device. This calculation will be described with reference to FIG. 2 and explained further later.

(ii) Make a decision (using the Service Optimizer entity) based on data collected by the LAN Gateway device as to whether to trigger a partial or complete switch from the data traffic for one or more of the network-reliant applications being carried using its current communications technology/connection to (some of) that data being carried using an alternative communication technology/connection or a combination of alternative communication technologies/connections. The decision is made based on whether a QoE score in respect of the user's application data being carried on the alternative communication technology/connection would be better than the QoE score if the user's application data were being carried using the current communication technology/connection. The decision can be made in respect of data in respect of any of the communication technologies/connections available and having connectivity to the user-device.

The LAN Gateway device is, for example, in the form of a so-called "Home Gateway Device" (such as a "Home Hub" from British Telecommunications plc); such a device is generally well-placed and well-suited to intercept traffic, monitor it, collect/analyse QoS network KPIs and calculate QoE scores. In the present embodiment, the LAN Gateway device has an embedded/attached wireless cellular network interface that allows it to communicate with a cellular network (such as a 2/3/4/5G cellular network) and to behave as an access point/relay for cellular devices, as well as an access point for WiFi devices.

FIG. 1 shows entities that may be involved in the described method. User-devices in a LAN 100 connect via the LAN Gateway device 101 in the LAN 100 to a remote device (e.g. a remote Content Server 170 connected to the Internet 150, or a Remote User-device 190 served by a remote ISP 180), either via a Fixed Network 120 (using Digital Subscriber Line (referred to as DSL or xDSL) technology or otherwise) or via a Base Station 131 of a Mobile Network 130 (using one or more of a variety of cellular/mobile technologies).

The user-devices (designated as 102*a* and 102*b*, and referred to generally as "102") may include devices such as mobile phones 102*a*, tablets, laptop and desktop computers 102*b*, and possibly other networked devices, with the respective devices communicating with the LAN gateway device 101 using wired or wireless technologies within the LAN. (Some (e.g. mobile devices 102*a*) are generally also able to communicate directly (via mobile base-stations and otherwise) with external networks outside the LAN using one or more types of cellular communication channels or other technologies. This will not be discussed in detail here, however, as it is not of specific relevance to the present explanation.

FIG. 1 includes simplified representations of the respective networks, concentrating on entities involved in or of particular relevance to the preferred embodiment. In particular, it shows simplified representations of Mobile Network 130 and ISP Fixed Network 120.

The Mobile Network 130 comprises an Evolved Packet Core (EPC) architecture of 4G cellular networks, which also serves 2G and 3G user-devices and is adaptable for 5G (non-standalone architecture) user-devices. The Mobile Network 130 includes several entities 131-136, all of which may participate in processing of user-device application data flows before forwarding this to the intended destination.

A cellular base station 131 receives and transmits radio signals sent according to respective cellular/mobile technology channels from a user-device 102, forwarding data received from LAN 100 to the Serving Gateway 132. The Serving Gateway 132 forwards and routes data in the form of packets between the cellular base station 131 and a Packet Gateway 135. The Packet Gateway 135 is the terminating entity for the user-device IP connection and also the interface between the Mobile Network 130 and other Packet Data Networks such as the Internet, an IP Multimedia Subsystem (IMS) network (not shown), etc. The Mobility Management module 133 is responsible for signalling control and user-device mobility management in the cellular network.

A Mobile Circuit Switching module 134 may provide an interconnection and routing of voice and circuit-switched traffic for the user-devices towards legacy PSTN network. In communication with the Packet Gateway 135 is a Policy Control and Charging module 136. This is a mobile 3GPP function able to look up user subscriptions and instruct the Packet Gateway 135 to enforce specific QoS KPI profiles for users accessing network services. It is responsible for enforcement of QoS policies, flow-based charging, and service-data flow detection for user-device data.

In FIG. 1, the entities of the ISP Fixed Network 120 shown are in the form of a Digital Subscriber Line Access Multiplexer (DSLAM) 122 and an Element Manager/Data Store 123. The DSLAM 122 is the network device in the ISP network that connects multiple customer xDSL lines via an interface to a high-speed digital communication channel (e.g. the Internet) using multiplexing techniques. It receives the QoS parameters of the customer connection from the Element Manager/Data Store 123 and matches the customer line parameters to the QoS parameters. The Element Manager/Data Store 123 is a function in the fixed ISP network 120 that maintains/stores the QoS parameters e.g. errored seconds, jitter, packet loss, etc., and instructs the Digital Subscriber Line Access Multiplexer (DSLAM) 122 to match the line parameters (e.g. speed) to the measured QoS parameters.

As will be explained later, methods according to the present embodiment generally involve steps being performed by, and interactions happening between, the LAN Gateway device 101 and the Service Optimizer entity 140 (or modules thereof), a computing device which would generally be outside the LAN 100 in question and separate from the individual external networks (in particular the Fixed Network 120 and the Mobile Network 130), but would in general operate under the control of the Internet Service Provider or Network Service Provider serving the LAN 100. The Service Optimizer 140 collects and stores QoE score data of user applications from all communications technologies/connections available to the LAN, and is generally the primary decision-making entity for the present implementation, for which the details are explained further below.

It will be appreciated that different applications can be invoked from user-devices 102 in LAN 100, such as the following:

File and streaming services can be requested from content servers 170 or using CDN edge nodes which could themselves be integrated as part of a local ISP network. Mechanisms for invoking retrieval from a specific CDN node can be improved by the Service Optimizer 140 for a given QoE score for a user application.

Peer-to-Peer (P2P) services may be invoked in which a user-device 102 in the LAN 100 may use a P2P application to interact with a remote user-device 190 served by a remote ISP 180. This could be a specific device for applications such as VoIP or a number of non-specific remote devices for peer-to-peer file-sharing, e-gaming, interactive services, etc. For this, service optimization may be controlled by a Service Optimizer entity 140 incorporated into the LAN Gateway device 101.

User-devices 102 may implement web browsing where the gateway for Internet access may reside in the fixed network 120 or packet gateway 135 of the Mobile network 130. The HTTP connection setup time and HTTP-failed Packet Data Network (PDN) connection can be vastly different based on whether the session involves fixed or mobile connectivity.

Other applications may be invoked where telemetry devices, sensors or other user-devices communicate with each other (e.g. device-to-device communications or IoT sensor applications).

As will be explained further, different types of flow characteristic may be of particular significance in respect of specific network-reliant applications in use on one or more user-devices 102 in the LAN 100, and may be designated as such. The correspondence between individual network-reliant applications and characteristics of particular significance thereto may be stored by the LAN Gateway device 101 or the Service Optimizer 140, or be otherwise available to one or both, allowing the correspondence to be taken into account in the decision as to how to apportion the data traffic in question.

Figure 2:
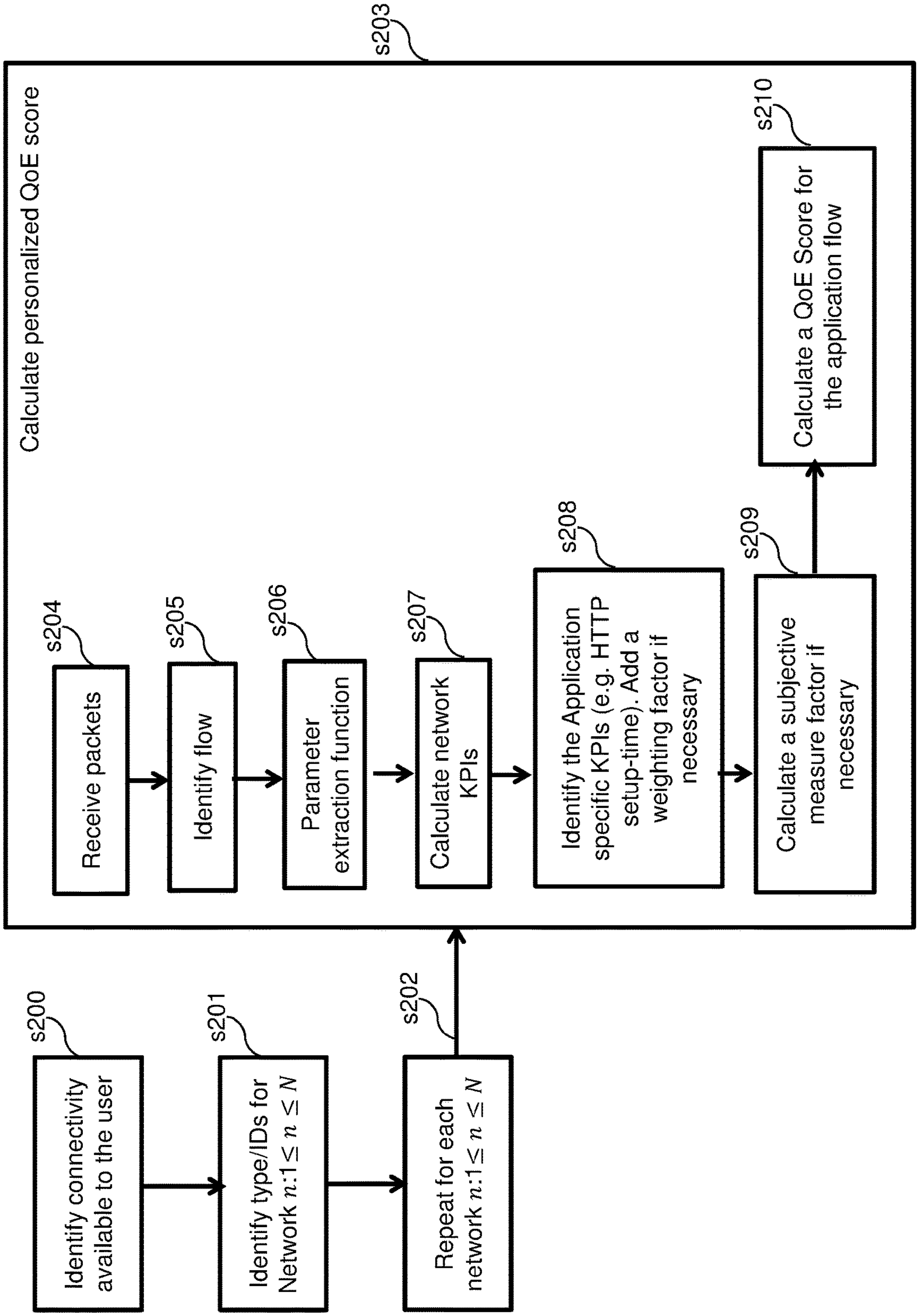
FIG. 2 illustrates steps that may be performed in order to calculate a Quality of Experience score for a particular application flow in a Local Area Network environment.

Referring now to FIG. 2, this illustrates steps performed according to the present embodiment by the LAN Gateway device 101, which collects or otherwise monitors packets travelling to and/or from all user-devices in the LAN on an ongoing basis, in order to calculate a QoE score for a particular application flow in a LAN environment. The steps are as follows:

(a) At step s200, the LAN Gateway device 101 identifies communication technologies/connections available for communication with the NSP core network (e.g. Fibre connectivity, ADSL (fixed), 4G (from a 4G modem integrated with the LAN Gateway, for example), other cellular channels, etc.).

(b) At step s201, the LAN Gateway device 101 identifies the type (Ethernet, 4G, WiFi, etc.) and the associated network ID. The Network IDs for the respective types may be the Service Set Identifier (SSID) for a wireless (WiFi) network, the Public Land Mobile Network (PLMN) ID for a fixed network, or the Mobile Network Code (MNC) and Mobile Country Code (MCC) for a cellular network technology (and the specific channel for a given 2-5G connection). This is done for each of the $n{:}1 \leq n \leq N$ available network technologies/connections.

(c) As indicated by step s202, the subsequent steps (referred to as (d) to (i) below) are then performed for each of the N network technologies/connections (s202).

(d) Once sufficient packets have been received (s204), an application flow is identified (s205). This can be implemented using DPI in the LAN Gateway 101. Parameters for this application flow (e.g. application type, session ID, Time To Live (TTL), Class of Service (CoS), etc.) are identified. DPI may identify header info, IP addresses, ports, etc.

(e) A parameter extraction function (s206) is run on the identified flow using information identified in the flow identification step (s205).

Depending on the application type: streaming, P2P networking, web access or file transfer, the destination of the traffic (e.g. a file server or CDN edge node), hybrid DPI approaches may be used, e.g. parsing DNS requests, counting the number of connections after initial SYN/ACK, identifying matching packets using sequence numbers, collecting packet delay and loss parameters, etc. Such information is used in the next step (s207).

(f) Network KPIs are calculated for the application flow (s207) (e.g. delay, packet error rate, loss rate, jitter) according to a standard or bespoke algorithm, based on the information calculated in step s206.

(g) Depending on the application, the application specific KPIs are identified, e.g. HTTP setup-time for a web-browsing applications. A weighting factor may be added if necessary (s208).

(h) If there are any application types that rely on subjective measures, these may be determined from previous measurements of the QoE data score (s209).

(i) A QoE Score is then calculated (s210) for the application flow as a function of the values obtained in steps s207, s208 and s209.

Figure 3:
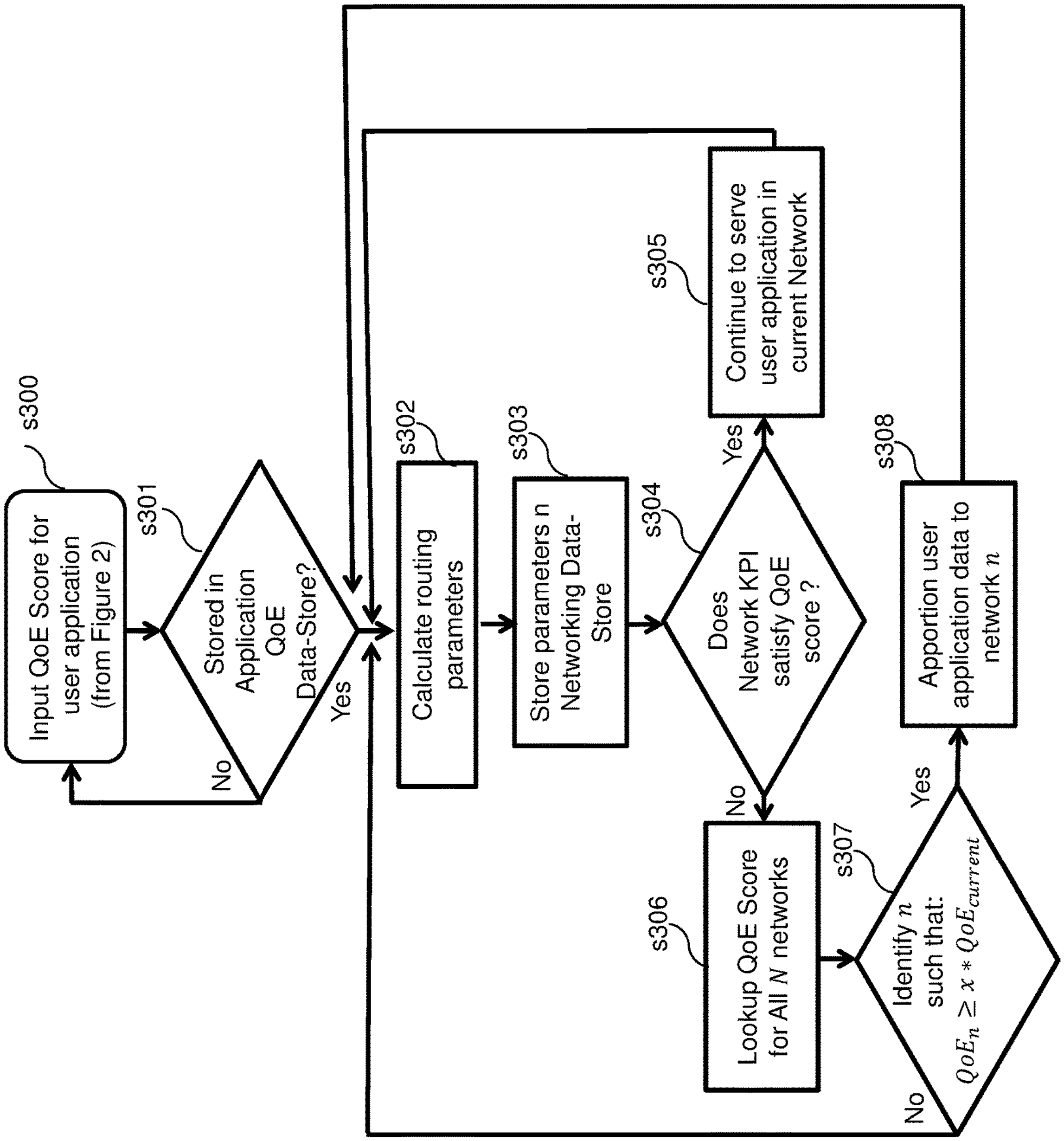
FIG. 3 illustrates steps that may be performed in order to make a decision regarding how a particular application flow will be served.

Referring now to FIG. 3, this illustrates steps performed according to the present embodiment by the Service Optimizer 140 in order to make a decision regarding how a particular application flow is to be served. The QoE score calculated (according to the process of FIG. 2) by the LAN Gateway device 101 for a particular user application is received as the input to this process (s300). From the data it receives from the LAN Gateway device 101, the Service Optimizer 140 checks if the application QoE score is stored in an Application QoE Data-Store (s301) (see FIG. 4). The Service Optimizer 140 then uses this QoE score and previous data held for this network technology/connection to instruct the LAN Gateway device 101 to calculate the current routing parameters for the application flow mapped to this QoE score (s302). It then stores these parameters in a Networking Data-Store (s303).

At this point, the Service Optimizer verifies if the current state of the network KP Is will satisfy the stored QoE score for the user's application. This relies on previous data of QoE score(s) and Network KPIs as detailed in FIG. 2.

If the network KPIs can satisfy the QoE score, then the Service Optimizer retains the user application in the "current" network (s305). The Service Optimizer continues to monitor the Network KPIs for the user application.

If the network KPIs do not satisfy the user application QoE score, the Service Optimizer looks up all QoE score values for the N available networks (s306). This is performed as a data retrieval instruction from the Application QoE Data-Store located at the Service Optimizer. The Service Optimizer compares the QoE scores for each (or a combination) of the other N networks to the "current" QoE score, if appropriate taking into account a multiplier x (s307).

The value of x may be set by the NSP and may be a function of:

Resource allocation in the N networks.

Reliability of the N networks.

Availability of the N networks.

Current and future user application demand.

Previous data records of QoE scores and Networking Data-Stores.

The Service Optimizer then instructs the LAN Gateway device to apportion the user application data in question to new network or technology n if the condition in (s307) is satisfied (s308). It will also keep monitoring the satisfaction of the QoE score (s304) to determine whether a further switch or load re-allocation should occur to any (or any combination of) other network(s) from the "current" network.

Other calculations may also be utilized. For example additional customized tests can be instructed by the Service Optimizer when the outcome of the comparison in step s304 is negative (i.e. results of these bespoke tests may feed into calculations of routing parameters at s302). Moreover, based on the outcome of step s302, additional specific tests, e.g. traceroute or VRF/VPN mapping of user application packets can be performed. Such mechanisms may be invoked and can form part of a portfolio of customized tests.

Figure 4:
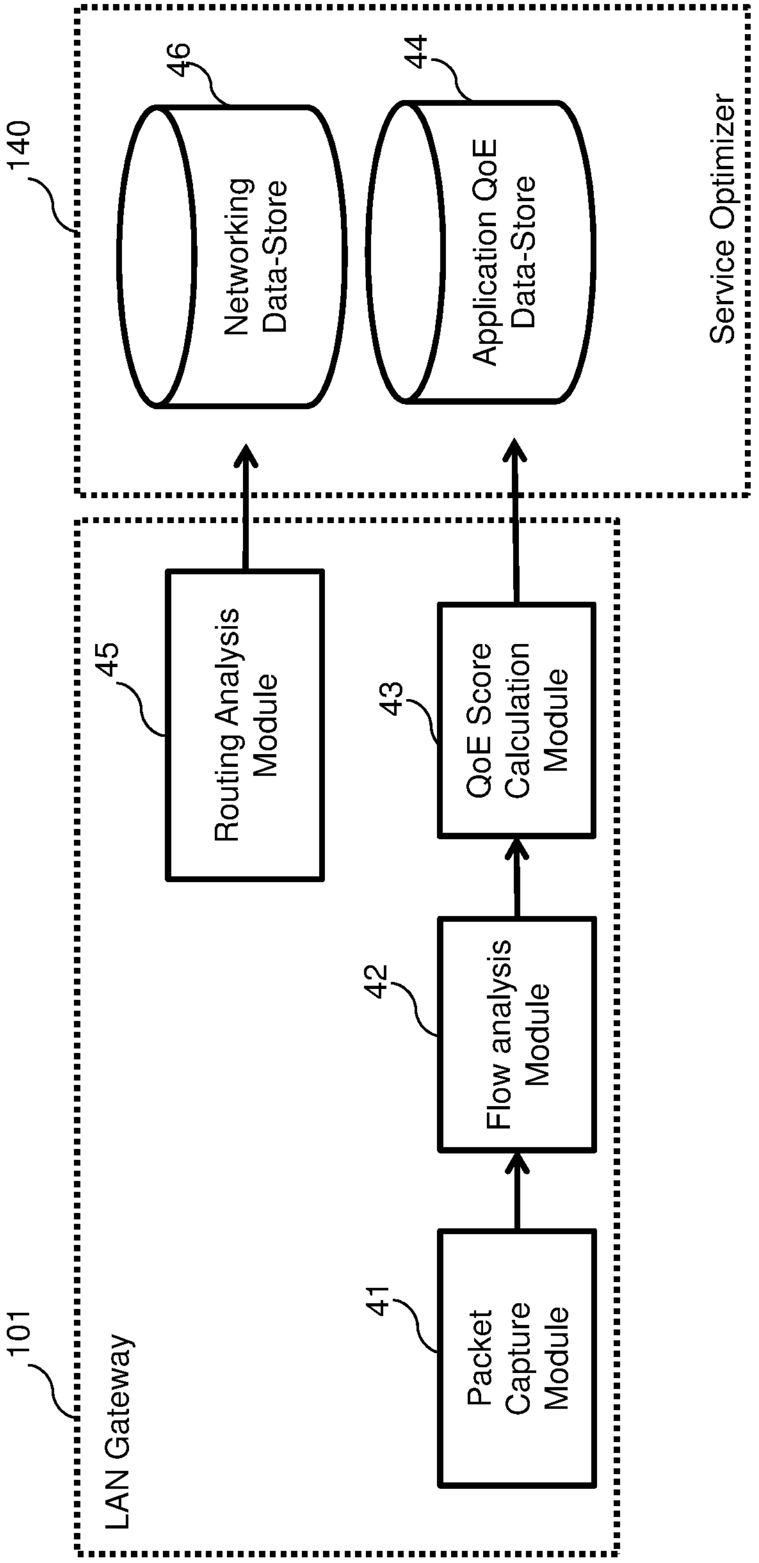
FIG. 4 illustrates modules that may be present in a Local Area Network Gateway device and in a Service Optimizer device such as those shown in FIG. 1.

Referring now to FIG. 4, this illustrates modules of the LAN Gateway device 101 and of the Service Optimizer 140 shown in FIG. 1, in particular those involved in application flow optimization according to the present embodiment. The modules involved within LAN Gateway device 101 include a Packet Capture module 41, a Flow Analysis module 42, a QoE Score Calculation module 43 and a Routing Analysis module 45. The Packet Capture module 41, QoE Score Calculation module 43 and Routing Analysis module 45 are used to perform the QoE score calculation per application flow as detailed earlier in FIG. 2. Data transfer between the LAN Gateway 101 and the Service Optimizer 140 occurs in the form of service optimization flows (shown in FIG. 1 using dot/dash arrows). The Service Optimizer 140 maintains an Application QoE Data-Store 44 and a Networking Data-Store 46, implemented as databases which may be interrogated by modules of the LAN Gateway 101 as part of the process according to the present embodiment.

Figure 5:
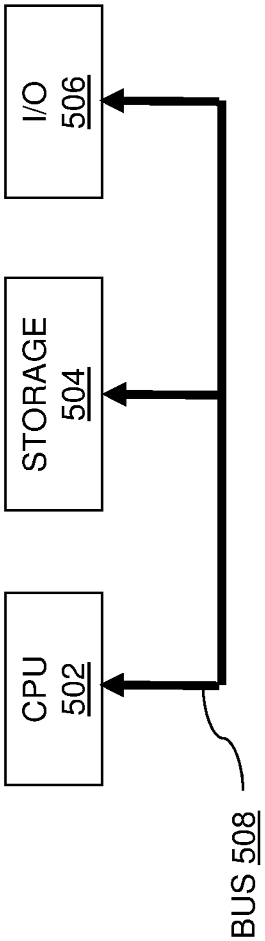
FIG. 5 is a block diagram of a computer system suitable for the operation of embodiments of the present invention.

FIG. 5 is a block diagram of a computer system suitable for the operation of embodiments of the present invention. A central processor unit (CPU) 502 is communicatively connected to a data store 504 and an input/output (I/O) interface 506 via a data bus 508. The data store 504 can be any read/write storage device or combination of devices such as a random access memory (RAM) or a non-volatile storage device, and can be used for storing executable and/or non-executable data. Examples of non-volatile storage devices include disk or tape storage devices. The I/O interface 506 is an interface to devices for the input or output of data, or for both input and output of data. Examples of I/O devices connectable to I/O interface 506 include a keyboard, a mouse, a display (such as a monitor) and a network connection.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the invention.

The scope of the invention may include other novel features or combinations of features disclosed herein. The applicant hereby gives notice that new claims may be formulated to such features or combinations of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method of apportioning data traffic between a plurality of different communication channels, in which the data traffic is:

travelling to and/or from at least one user-device in a local area network, in which a plurality of network-reliant applications are used;

in respect of the network-reliant applications; and travelling via a local area network gateway device of the local area network, in which the local area network gateway device is configured to communicate via one or more networks outside the local area network using the plurality of different communication channels;

the method comprising the steps of:

in respect of each of the plurality of different communication channels, calculating a Quality of Experience (QoE) score, wherein each QoE score is obtained by performing the steps of:

identifying flows carrying the data traffic via said communication channel;

identifying the same flow characteristics of said flows for each of the plurality of network-reliant applications;

identifying, for each the of said plurality of network-reliant applications, a set of one or more flow characteristic types designated as significant flow characteristic types for the network-reliant applications, wherein different flow characteristic types are designated as significant flow characteristic types for each of the different network-reliant applications; and calculating the QoE score for the communication channel in dependence on the same identified flow characteristics of said flows and on only the identified flow characteristic types designated as significant flow characteristic types for the network-reliant applications in respect of which flows have been identified; and then apportioning between the communication channels the data traffic in dependence on the calculated QoE scores for each of the plurality of different communication channels such that the data traffic being carried on a current communication channel of the plurality of different communication channels is partially switched to at least one other communication channel of the plurality of different communication channels so that some of the data traffic is carried by the at least one other communication channel.

2. The method according to claim 1 wherein each communication channel is a network connection according to a specific access technology.

3. The method according to claim 1 wherein the communication channels include at least one Digital Subscriber Line, xDSL communication channel.

4. The method according to claim 1 wherein the communication channels include at least one cellular communication channel.

5. The method according to claim 4 wherein the communication channels include more than one cellular communication channel.

6. The method according to claim 4 wherein the communication channels include at least one of 2G, 3G, 4G and 5G.

7. The method according to claim 1 wherein the step of obtaining the QoE score comprises use of Deep Packet Inspection in respect of the data traffic.

8. The method according to claim 1 wherein the step of obtaining the QoE score in respect of a communication channel is performed by the local area network gateway device.

9. The method according to claim 1 wherein the QoE score for a communication channel is calculated in dependence on one or more characteristics in respect of data traffic being carried via said communication channel, the one or more characteristics being selected from the following:

characteristics associated with communication speed;
characteristics associated with communication delay and/or delay variation;
characteristics associated with reliability;
characteristics associated with data loss;
characteristics associated with error rate; or
characteristics associated with communications quality.

10. An apparatus configured to apportion data traffic between a plurality of different communication channels, the data traffic to be apportioned being data traffic travelling to and/or from at least one user-device in a local area network in which a plurality of network-reliant applications are used, the data traffic in respect of the network-reliant applications travelling via a local area network gateway device of the local area network configured to communicate via one or more networks outside the local area network using the plurality of different communication channels, the apparatus comprising a processor and a non-transitory computer-readable medium storing computer program code such that upon execution of the computer program code by the processor, the apparatus is at least configured to: in respect of each of the plurality of different communication channels, calculate a Quality of Experience (QoE) score, wherein each QoE score is obtained by the apparatus being configured to:

identify flows carrying the data traffic via said communication channel;
identify the same flow characteristics of said flows for each of the plurality of network-reliant applications;
identify, for each the of said plurality of network-reliant applications, a set of one or more flow characteristic types designated as significant flow characteristic types for the network-reliant applications, wherein different flow characteristic types are designated as significant flow characteristic types for each of the different network-reliant applications; and
calculate the QoE score for the communication channel in dependence on the same identified flow characteristics of said flows and on only the identified flow characteristic types designated as significant flow characteristic types for the network-reliant applications in respect of which flows have been identified; and
then apportion between the communication channels the data traffic in dependence on the calculated QoE scores for each of the plurality of different communication channels such that the data traffic being carried on a current communication channel of the plurality of different communication channels is partially switched to at least one other communication channel of the plurality of different communication channels so that some of the data traffic is carried by the at least one other communication channel.

11. The apparatus according to claim 10 wherein the apparatus comprises the local area network gateway device.

12. A non-transitory computer-readable storage medium storing computer program code to, when loaded into a computer system and executed thereon, cause the computer system to perform the steps of a method as claimed in claim 1.

13. The apparatus according to claim 10, wherein the apparatus is further configured to calculate the QoE score for a communication channel in dependence on one or more characteristics in respect of data traffic being carried via said communication channel, the one or more characteristics being selected from the following:

characteristics associated with communication speed;
characteristics associated with communication delay and/or delay variation;
characteristics associated with reliability;
characteristics associated with data loss;
characteristics associated with error rate; or
characteristics associated with communications quality.

* * * * *